(12) United States Patent
Zhu et al.

(10) Patent No.: US 8,524,840 B2
(45) Date of Patent: Sep. 3, 2013

(54) POLYURETHANE SEALANT COMPOSITIONS HAVING PRIMERLESS TO PAINT AND GLASS PROPERTIES

(75) Inventors: Huide D. Zhu, Rochester, MI (US); Daniel P. Heberer, Rochester Hills, MI (US)

(73) Assignee: Dow Global Technologies LLC, Midland, MI (US)

( * ) Notice: Subject to any disclaimer, the term of this patent is extended or adjusted under 35 U.S.C. 154(b) by 2020 days.

(21) Appl. No.: 11/442,839

(22) Filed: May 30, 2006

(65) Prior Publication Data

US 2006/0270807 A1 Nov. 30, 2006

Related U.S. Application Data

(60) Provisional application No. 60/685,911, filed on May 31, 2005.

(51) Int. Cl.
*C08G 18/48* (2006.01)

(52) U.S. Cl.
USPC ............... 525/458; 525/453; 525/474

(58) Field of Classification Search
USPC .......................................... 525/453
See application file for complete search history.

(56) References Cited

U.S. PATENT DOCUMENTS

| | | | |
|---|---|---|---|
| 3,707,521 A | 12/1972 | De Santis | |
| 3,779,794 A | 12/1973 | De Santis | |
| 3,895,043 A | 7/1975 | Wagner et al. | |
| 4,345,053 A | 8/1982 | Rizk et al. | |
| 4,374,237 A | 2/1983 | Berger et al. | |
| 4,525,511 A | 6/1985 | Kirby et al. | |
| 4,625,012 A | 11/1986 | Rizk et al. | |
| 4,687,533 A | 8/1987 | Rizk et al. | |
| 4,857,623 A | 8/1989 | Emmerling et al. | |
| 4,910,255 A | 3/1990 | Wakabayashi et al. | |
| 4,910,279 A | 3/1990 | Gillis et al. | |
| 5,370,905 A | 12/1994 | Varga et al. | |
| 5,623,044 A | 4/1997 | Chiao | |
| 5,741,383 A * | 4/1998 | Kneisel | 156/108 |
| 5,852,137 A | 12/1998 | Hsieh et al. | |
| 5,922,809 A | 7/1999 | Bhat et al. | |
| 6,015,475 A | 1/2000 | Hsieh et al. | |
| 6,319,311 B1 * | 11/2001 | Katz et al. | 106/287.11 |
| 6,362,300 B1 | 3/2002 | Araki et al. | |
| 8,512,033 | 1/2003 | Zlyan Wu | |
| 6,828,643 B2 | 12/2004 | Fulcher | |
| 2004/0204539 A1 | 10/2004 | Schindler et al. | |

FOREIGN PATENT DOCUMENTS

| | | |
|---|---|---|
| EP | 0 219 185 A1 | 4/1987 |
| JP | 58-109529 A | 6/1983 |
| JP | 2-167365 A | 12/1988 |
| JP | 2003-321665 A | 11/2003 |

OTHER PUBLICATIONS

Polymer Additives and Colors: Heat Stabilizers. May 14, 2001. <www.specialchem4polymers.com>.*
Wacker Silicones, Geniosil, SLM 414100, pp. 1-3, Trimethoxysilylpropylcarbamate-terminated polyether, CAS 216597-12-5.
Wacker Silicones, Geniosil, Geniosil STP-E 10, pp. 1-3, Dimethoxy(methyl)silylmethyl-carbamate-terminated polyether, CAS 611222-18-5.
Wacker Silicones, Geniosil, SLM 414000, pp. 1-3, Dimethoxy(methyl)silylmethyl-carbamate-terminated polyether, CAS 611222-18-5.
Wacker Silicones, Silane-Terminated Polyethers, Geniosil STP-E, Intelligent Industry Solutions, pp. 1-19.

* cited by examiner

*Primary Examiner* — Mike M Dollinger
(74) *Attorney, Agent, or Firm* — The Dobrusin Law Firm, P.C.

(57) ABSTRACT

In one aspect, this invention is a composition comprising a urethane prepolymer having isocyanate moieties; a catalytic amount of a compound which catalyzes the reaction of isocyanate moieties with water or an active hydrogen containing compound; alpha hydrocarbyl silane compound; and a catalytic amount of a compound which catalyzes silanol condensation. The composition of the invention can be used to bond a window into a structure without the need to prime the window or the window flange of the structure.

18 Claims, No Drawings

POLYURETHANE SEALANT COMPOSITIONS HAVING PRIMERLESS TO PAINT AND GLASS PROPERTIES

CROSS REFERENCE TO RELATED APPLICATION

This application claims the benefit of priority from U.S. Provisional Application No. 60/685,911, filed May 31, 2005.

FIELD OF INVENTION

This invention relates to polyurethane sealant compositions which are capable of being used without the need for a primer. More particularly, the sealant compositions can bond without the need for a primer to a coated surface such as a window flange and to glass, to clear plastic coated with an abrasion resistant coating (coated plastic) or to glass or coated plastic further coated with a frit such as a ceramic or organic frit.

BACKGROUND OF THE INVENTION

Polyurethane sealant compositions typically comprise at least one urethane prepolymer. Sealants useful for bonding to non-porous substrates, such as glass are described, for example, in U.S. Pat. No. 4,374,237 and U.S. Pat. No. 4,687,533, both incorporated herein by reference. U.S. Pat. No. 4,374,237 describes a polyurethane sealant containing urethane prepolymers which have been further reacted with secondary amine compounds containing two silane groups. U.S. Pat. No. 4,687,533 describes a polyurethane sealant containing urethane prepolymers, which contain silane groups, which have been prepared by reacting a polyisocyanate having at least three isocyanate groups with less than an equivalent amount of an alkoxysilane, having a terminal group containing active hydrogen atoms reactive with isocyanate groups to form an isocyanatosilane having at least two unreacted isocyanate groups. In a second step, the isocyanatosilane is mixed with additional polyisocyanate and the mixture is reacted with a polyol to form polyurethane prepolymer having terminal isocyanato groups and pendant alkoxysilane groups.

Window installation in a vehicle is typically a three-stage process. First, a clear silane primer is applied to the glass to clean and prepare the surface for bonding. Second, a primer, which is essentially a carbon black dispersion which also contains a compound having silane and/or isocyanate functionality, often referred to as "black-out primer", is then applied over the top of the clear primer. Third, an adhesive is applied to the primed glass which is then installed into the structure. For vehicles and some buildings, these materials are applied to a frit of a ceramic enamel or an organic coating located about the periphery of the window. The frit is designed to protect the adhesive from exposure to UV light and to hide the adhesive and/or trim components from view, see, U.S. Pat. No. 5,370,905, incorporated herein by reference. Further, when such compositions are used to bond glass substrates to painted substrates, such as for instance, window installation in vehicle manufacturing, the lap shear strength of the bonded substrate may be less than desirable for safety or structural purposes. Consequently, a separate paint primer comprising a solution of one or more silanes is often applied to a painted substrate prior to the application of the composition in most vehicle assembly operations for bonding the windshield and the rear window. The use of primers in assembly operations is undesirable in that it introduces extra steps, additional cost, the risk of marring the painted surface if dripped on an undesired location and exposes the assembly line operators to additional chemicals.

In order for a primer and adhesive system to be commercially viable, that system must provide a durable bond. "Durable bond" means that the adhesive holds the window into the structure for a period of years. As the structure to which window glass or plastic coated with an abrasion resistant coating is traditionally bonded lasts for a significant number of years, it is expected that the bond holding the glass or coated plastic into a structure also last a significant number of years.

It would be desirable to provide a composition which, when bonded to a painted substrate and glass or coated plastic and cured, provides a bonded structure with a higher lap shear strength, particularly when used in the absence of a paint primer and/or a primer on the glass or coated plastic. What is further needed is a system which allows for durable adhesion of the composition to the substrate surfaces.

SUMMARY OF THE INVENTION

In one aspect, the invention is a composition comprising:
(1) one or more urethane prepolymers having isocyanate functional moieties;
(2) a catalytic amount of one or more compounds which catalyze the reaction of isocyanate moieties with water or an active hydrogen containing compound; and
(3) one or more alpha hydrocarbyl silane compounds having at least one hydrolyzable group bonded to a silicone atom and bonded to the carbon bonded to the silicone atom, the alpha carbon atom, a hydrocarbyl group through a heteroatom functional linkage;

In a preferred embodiment, the prepolymer further comprises a silane functionality or the composition further comprises a compound or polymer which contains silane moieties and is compatible with the polyurethane prepolymer.

In many instances, the catalyst for the isocyanate and water or active hydrogen atom reaction will also catalyze a silanol condensation reaction. In some embodiments it may be desirable to add to the composition a catalytic amount of one or more compounds, which catalyze silanol condensation, wherein such catalyst is different than the catalyst for the isocyanate and water or active hydrogen containing compound reaction, that is, a catalytic amount of one or more compounds, which catalyze the reaction of isocyanate moieties with water or an active hydrogen containing compound.

The composition of the invention is useful for bonding glass or coated plastic to a substrate. Preferably, the glass or coated plastic is shaped into a window and the substrate is a window flange of a structure such as a building or an automobile. Preferably, the glass or coated plastic and/or the substrate are not primed prior to contacting the adhesive to the appropriate surfaces.

In another embodiment, the invention is a method for bonding glass to a substrate which comprises contacting a composition according to the invention with glass or coated plastic and another substrate with the composition of the invention disposed between the glass or coated plastic and substrate and thereafter allowing the composition to cure so as to bond the glass or coated plastic to the substrate.

The composition of the invention is useful in bonding glass and/or coated plastic to plastic, metal, fiberglass and composite substrates which may or may not be coated or painted. The composition gives unexpectedly high lap shear strength when no primer compositions have previously been applied to a painted plastic, metal, fiberglass or composite substrate and/ or glass or coated plastic. The coated plastic can be a clear plastic having an abrasion resistant coating disposed on the surface. The compositions of the invention bond to coated substrates, for instance, those coated with acid resistant coating systems and/or glass or coated plastic without the need for primers, achieve faster link-up in low temperature conditions and maintain adhesion when exposed to weathering conditions.

DETAILED DESCRIPTION OF THE INVENTION

The prepolymers used in the invention can be conventional prepolymers used in polyurethane adhesive compositions. In a preferred embodiment, the prepolymers are blended with a compound or polymer having silane functionality. In another preferred embodiment, the prepolymer contains silane functionality as well as isocyanate functionality. A urethane prepolymer having silane functionality may be the entire prepolymer used in the adhesive or it may be blended with a prepolymer which does not have silane functionality.

Preferable urethane prepolymers for use in preparing the composition of the invention include any compound having an average isocyanate functionality of at least about 2.0 and a molecular weight (weight average) of at least about 2,000. Preferably, the average isocyanate functionality of the prepolymer is at least about 2.2, and is more preferably at least about 2.4. Preferably, the isocyanate functionality is no greater than about 4.0, more preferably no greater than about 3.5 and most preferably no greater than about 3.0. Preferably, the weight average molecular weight of the prepolymer is at least about 2,500 and is more preferably at least about 3,000; and is preferably no greater than about 40,000, even more preferably no greater than about 20,000, more preferably no greater than about 15,000 and is most preferably no greater than about 10,000. The prepolymer may be prepared by any suitable method, such as by reacting an isocyanate-reactive compound containing at least two isocyanate-reactive, active hydrogen containing, groups with an excess over stoichiometry of a polyisocyanate under reaction conditions sufficient to form the corresponding prepolymer.

Preferable polyisocyanates for use in preparing the prepolymer include any aliphatic, cycloaliphatic, araliphatic, heterocyclic or aromatic polyisocyanate, or mixtures thereof. Preferably, the polyisocyanates used have an average isocyanate functionality of at least about 2.0 and an equivalent weight of at least about 80. Preferably, the isocyanate functionality of the polyisocyanate is at least about 2.0, more preferably at least about 2.2, and is most preferably at least about 2.4; and is preferably no greater than about 4.0, more preferably no greater than about 3.5, and most preferably no greater than about 3.0. Higher functionality may also be used, but may cause excessive cross-linking, and result in an adhesive which is too viscous to handle and apply easily, and can cause the cured adhesive to be too brittle. Preferably, the equivalent weight of the polyisocyanate is at least about 80, more preferably at least about 110, and is most preferably at least about 120; and is preferably no greater than about 300, more preferably no greater than about 250, and most preferably no greater than about 200.

Examples of preferable polyisocyanates include those disclosed by Wu, U.S. Pat. No. 6,512,033 at column 3, line 3 to line 49, incorporated herein by reference. More preferred isocyanates are aromatic isocyanates, alicyclic isocyanates and derivates thereof. Even more preferred polyisocyanates include diphenylmethane diisocyanate and polymeric derivatives thereof, isophorone diisocyanate, tetramethylxylene diisocyanate, 1,6-hexamethylene di isocyanate and polymeric derivatives thereof, bis(4-isocyanatocylohexyl)methane, and trimethyl hexamethylene diisocyanate. The most preferred isocyanate is diphenylmethane diisocyanate.

The term "isocyanate-reactive compound" as used herein includes any organic compound having at least two isocyanate-reactive moieties, such as a compound containing an active hydrogen moiety, or an imino-functional compound. For the purposes of this invention, an active hydrogen containing moiety refers to a moiety containing a hydrogen atom which, because of its position in the molecule, displays significant activity according to the Zerewitnoff test described by Wohler in the *Journal of the American Chemical Society*, Vol. 49, p. 3181 (1927). Illustrative of such active hydrogen moieties are —COOH, —OH, —NH$_2$, —NH—, —CONH$_2$, —SH, and —CONH—. Preferable active hydrogen containing compounds include polyols, polyamines, polymercaptans and polyacids. Suitable imino-functional compounds are those which have at least one terminal imino group per molecule, such as are described, for example, in U.S. Pat. No. 4,910,279, which is hereby incorporated by reference in its entirety. Preferably, the isocyanate reactive compound is a polyol, and is more preferably a polyether polyol.

Preferable polyols useful in the preparation of the prepolymers include those disclosed in Wu, U.S. Pat. No. 6,512,033 at column 4 line 10 to line 64, incorporated herein by reference, and include, for example, polyether polyols, polyester polyols, poly(alkylene carbonate)polyols, hydroxyl containing polythioethers, polymer polyols (dispersions of vinyl polymers in such polyols, commonly referred to as copolymer polyols) and mixtures thereof. Preferably, the isocyanate-reactive compound has a functionality of at least about 1.5, more preferably at least about 1.8, and is most preferably at least about 2.0; and is preferably no greater than about 4.0, more preferably no greater than about 3.5, and is most preferably no greater than about 3.0. Preferably, the equivalent weight of the isocyanate-reactive compound is at least about 200, more preferably at least about 500, and is more preferably at least about 1,000; and is preferably no greater than about 5,000, more preferably no greater than about 3,000, and is most preferably no greater than about 2,500.

Preferably, the prepolymers useful in the invention demonstrate the viscosity sufficient to allow the use of the prepolymers in adhesive formulations. Preferably, the prepolymers as prepared demonstrate a viscosity of about 6,000 centipoise (600 N—S/m$^2$) or greater and more preferably about 8,000 centipoise (800 N—S/m$^2$) or greater. Preferably, the polyurethane prepolymers demonstrate a viscosity of about 30,000 centipoise (3,000 N—S/m$^2$) or less and more preferably about 20,000 centipoise (2,000 N—S/m$^2$) or less. Above about 30,000 centipoise (3,000 N—S/m$^2$), the polyurethane compositions become too viscous to pump and therefore cannot be applied using conventional techniques. Below about 6,000 centipoise (600 N—S/m$^2$), the prepolymers do not afford sufficient integrity to allow the compositions utilizing the prepolymers to be utilized in desired applications. Viscosity as used herein is measured by the Brookfield Viscometer, Model DV-E with a RV spindle #5 at a speed of 5 revolutions per second and at a temperature of 25° C.

The amount of isocyanate containing compound used to prepare the prepolymer is that amount that gives the desired properties, that is, the appropriate free isocyanate content and viscosities as discussed hereinbefore. Preferably, the isocyanates are used to prepare in the prepolymer in an amount of about 6.5 parts by weight or greater, more preferably about 7.0 parts by weight or greater and most preferably about 7.5 parts by weight or greater. Preferably, the polyisocyanates used to prepare the prepolymer are used in an amount of about 12 parts by weight or less, more preferably 10.5 about parts by weight or less and most preferably about 10 parts by weight or less.

One or more as used herein means that at least one, and more than one, of the recited components may be used as disclosed. Nominal as used with respect to functionality means the theoretical functionality, generally this can be calculated from the stoichiometry of the ingredients used. Generally, the actual functionality is different due to imperfections in raw material, incomplete conversion of the reactants and formation of by-products.

The polyols (diols and triols) are present in an amount sufficient to react with most of the isocyanate groups of the isocyanates leaving enough isocyanate groups to give the desired free isocyanate content of the prepolymer. Preferably, the polyols are present in an amount of about 30 parts by weight or greater based on the weight of the prepolymer, more preferably about 35 parts by weight or greater and most preferably about 40 parts by weight or greater. Preferably, the polyols are present in an amount of about 75 parts by weight or less based on the weight of the prepolymer, more preferably about 65 parts by weight or less and most preferably about 60 parts by weight or less.

The prepolymer may be prepared by any suitable method, such as bulk polymerization and solution polymerization. The reaction to prepare the prepolymer is carried out under anhydrous conditions, preferably under an inert atmosphere such as a nitrogen blanket, to prevent crosslinking of the isocyanate groups by atmospheric moisture. The reaction is preferably carried out at a temperature between about 0° C. and about 150° C., more preferably between about 25° C. and about 80° C., until the residual isocyanate content determined by titration of a sample is very close to the desired theoretical value. The isocyanate content in the prepolymers is preferably in the range of about 0.1 percent to about 10 percent, more preferably in the range of about 1.5 percent to about 5.0 percent and most preferably in the range of about 1.8 percent to about 3.0 percent.

The prepolymer is present in the composition of the invention in sufficient amount such that the sealant is capable of bonding glass or coated plastic to metal, plastic, fiberglass or composite substrates, preferably the substrates are coated or painted and more preferably the substrates are painted with acid resistant paints. Preferably, the polyurethane prepolymer is present in an amount of about 30 parts by weight or greater based on the weight of the composition, more preferably about 50 parts by weight or greater and most preferably about 55 parts by weight or greater. Preferably, the polyurethane prepolymer is present in an amount of about 99.8 parts by weight or less based on the weight of the sealant, more preferably about 98 parts by weight or less and most preferably about 85 parts by weight or less.

The composition of the invention further comprises a silane compound containing at least one hydrolyzable group bonded to at least one silicone atom of the silane compound. The silane compound further has a hydrocarbyl group bonded to a carbon through a heteroatom containing functional linkage wherein the carbon atom is further bonded to at least one of the silicone atoms having a hydrolyzable group bonded thereto. The carbon atom which is bonded to a functional group, such as a silane having at least one hydrolyzable group bonded thereto, is referred to in some nomenclature systems as the alpha carbon atom and in other nomenclature systems as the 1 carbon atom. For brevity sake these compounds will be referred to hereinafter as alpha hydrocarbyl silanes. The hydrocarbyl group can be any carbon and hydrogen based group which does not interfere in how the alpha hydrocarbyl silane functions in the compositions of the invention and which results in stable compositions of the invention. Stable as used in this context means that the compositions do not undergo unacceptable reaction while stored in an environment protected from moisture over a six month period. Unacceptable reaction means the reaction causes the viscosity of the composition to increase to a level such that the composition cannot be applied using common techniques. Preferably, the viscosity of the composition does not increase by more than 50 percent over a 6 month period, more preferably not more than 30 percent, while stored in a moisture proof container. The hydrocarbyl group may further contain one or more heteroatoms in the backbone. Preferably, the backbone is an aliphatic backbone or a polyether, such as a polyalkylene oxide backbone. The preferred aliphatic backbones are the $C_{1-10}$ straight and branched chain aliphatic hydrocarbons, with the $C_{2-8}$ straight and branched chain aliphatic hydrocarbons being the most preferred. Of the polyalkylene oxide backbones, the polyoxyalkylene oxides based on tetrahydrofuran, butane diol, butylene oxide, propylene oxide and ethylene oxide are preferred, with those based on ethylene oxide, propylene oxide or mixtures thereof even more preferred. The hydrocarbyl group is bonded to the alpha carbon atom through a heteroatom containing functional linkage. The heteroatom functional linkage can be any functional linkage that is capable of linking a hydrocarbyl group to an alpha carbon atom bonded to a silane group and which does not interfere with the function of the alpha hydrocarbyl silane in the compositions of the invention. Preferably, the heteroatom containing functional linkage contains an oxygen, nitrogen and/or a sulfur moiety. Preferable heteroatom functional linkages include ethers, thioethers, secondary and tertiary amines, carbonyl, carbonyloxy, amido, urethane, urea groups and the like. Preferred heteroatom containing functional linkages are ureas and urethanes. Preferably, at least one of the silicone atoms of the compound has bonded thereto two or three hydrolyzable groups. The hydrolyzable group is not particularly limited and is selected from conventional hydrolyzable groups. Specific examples are a hydrogen atom, a halogen atom, an alkoxy group, an acyloxy group, a ketoximate group, an amino group, an amido group, an acid amido group, an amino-oxy group, a mercapto group, and an alkenyloxy group. Preferred among them are a hydrogen atom, an alkoxy group, an acyloxy group, a ketoximate group, an amino group, an amido group, an amino-oxygroup, a mercapto group, and an alkenyloxy group. An alkoxy group is more preferred with a methoxy or ethoxy group being most preferred.

Preferably, the alpha hydrocarbyl silane corresponds to the formula

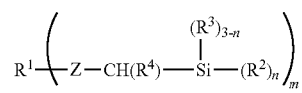

wherein
$R^1$ is independently in each occurrence a hydrocarbon group, which may contain one or more heteroatoms;
$R^2$ is independently in each occurrence a hydrolyzable group;
$R^3$ is independently in each occurrence a monovalent hydrocarbon;
$R^4$ is independently in each occurrence hydrogen or alkyl;
Z is independently in each occurrence a heteroatom containing functional linkage;

n is independently in each occurrence an integer of 1 to 3; and m is about 1 or greater.

$R^1$ is preferably an aliphatic hydrocarbon or aliphatic polyether; more preferably a $C_{1-10}$ straight or branched chain aliphatic group or a polyalkylene oxide group; more preferably a $C_{2-8}$ straight or branched chain aliphatic group or a $C_{2-4}$ polyalkylene oxide chain and most preferably the polyalkylene oxide chain is based on ethylene oxide, propylene oxide or a mixture thereof. The hydrolyzable group represented by $R^2$ is not particularly limited and is selected from conventional hydrolyzable groups. Specific examples are a hydrogen atom, a halogen atom, an alkoxy group, an acyloxy group, a ketoximate group, an amino group, an amido group, an acid amido group, an amino-oxy group, a mercapto group, and an alkenyloxy group. Preferred among them are a hydrogen atom, an alkoxy group, an acyloxy group, a ketoximate group, an amino group, an amido group, an amino-oxygroup, a mercapto group, and an alkenyloxy group. An alkoxy group, is more preferred with a methoxy or ethoxy group being most preferred. Preferably, $R^2$ is independently in each occurrence hydrocarbyloxy; more preferably an alkyloxy, acyloxy, amino, and alkenyloxy group. Even more preferably, $R^2$ is a $C_{1-10}$ alkyloxy or alkenyloxy group and even more preferably a $C_{1-10}$ alkyloxy group. Most preferably, $R^2$ is $C_{1-3}$ alkyloxy, with methoxy being the most preferred. Preferably, $R^3$ is independently in each occurrence an alkyl group having 1 to 20 carbon atoms, an aryl group having 6 to 20 carbon atoms, a cycloalkyl group having 5 to 20 carbon atoms and an aralkyl group having 7 to 20 carbon atoms. $R^3$ is more preferably methyl, ethyl, cyclohexyl, phenyl, or benzyl group; even more preferably a cyclohexyl, benzyl, methyl or ethyl group; with methyl or ethyl even more preferred and methyl most preferred. Z is preferably oxygen, sulfur, a tertiary or secondary amine ($N(R^4)$), carbonyl or a functional group corresponding to the formula

(X)aC(X)a;

X is independently in each occurrence oxygen, sulfur or $N(R^4)$ wherein $R^4$ described hereinbefore; and a is independently in each occurrence 0 or 1 with the proviso that for every instance of the represented functional group the sum of a is 1 or 2 and preferably 2. Preferably, Z is:

(X)aC(X)a

X is preferably O or $N(R^4)$. $R^4$ is preferably $C_{1-3}$ alkyl or hydrogen, even more preferably methyl or hydrogen. Preferably, m is 2 or greater. Preferably, in is 8 or less, more preferably 6 or less, even more preferably 4 or less and most preferably 3 or less. In a most preferred embodiment in is 2. Preferably, n is 2 or 3.

The alpha hydrocarbyl silanes may be prepared by means known to those skilled in the art of organic synthetic chemistry. In a preferred embodiment, the alpha hydrocarbyl silanes are prepared by reacting a silane compound having a reactive moiety on the alpha carbon, alpha silane, with a hydrocarbyl containing compound with a functional group reactive with the functional moiety on the silane compound. The functional groups on the two compounds can be any set of functional groups reactive with one another such that the resulting product joins the silane to the hydrocarbyl group under reasonable conditions. Pairs of functional groups which are reactive with one another are well known to the skilled artisan in the field of synthetic organic chemistry. Preferably, the reactive moieties are selected such that they undergo a condensation reaction with one another. Among preferable functional groups are primary or secondary amines, thiols, isocyanates, hydroxyl, carboxylic acids, aldehydes, halogens, acid halides, epoxy groups and the like. Preferred are the hydroxyl, amines, and isocyanates. Preferably, the composition of the invention comprises the reaction product of one or more alpha silanes and one or more compounds having a hydrocarbyl group, wherein one of the compounds has an isocyanate functional group and the other having an active hydrogen atom containing moiety as described hereinbefore. The active hydrogen containing moiety is any hydrogen containing moiety which reacts with an isocyanate moiety. Preferably, the hydrocarbyl group containing compound contains 1 or more functional groups, more preferably 2 or more. Preferably, such compounds contain 8 or less active functional groups, more preferably 6 or less, even more preferably 4 or less and most preferably 3 or less. The most preferable hydrocarbyl group containing compounds have a functionality of about 2. The preferred hydrocarbyl group containing compounds correspond to the formula ti $R^1\!-\!(Y)_m$ wherein $R^1$ and m are as described previously; Y is independently in each occurrence a reactive moiety which reacts with the moiety contained on the alpha silane. Preferably, Y is halo, hydroxyl, thiol, primary or secondary amino, acid halide, carboxyl, aldehyde, isocyanato, alkoxy, alkylthiol, epoxy groups and the like. Preferably, Y is hydroxyl, isocyanato, primary or secondary amino.

The alpha silane is a compound which has a functional moiety which is reactive with the functional moiety on the hydrocarbyl group containing compound and a silane group having at least one hydrolyzable moiety bonded to the silane wherein the two groups are connected by a single carbon atom. The functional groups that may be found on the alpha silane are those described for the hydrocarbyl group containing compound. The particular functional moiety is chosen such that the two compounds are reactive with one another such that the hydrocarbyl compound and the alpha silane can be bonded together through a functional linkage. Preferable alpha-silanes correspond to the formula

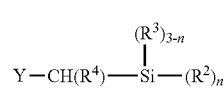

wherein Y, $R^2$, $R^3$, $R^4$ and n are described hereinbefore.

The resulting alpha hydrocarbyl silane may be represented by the formula

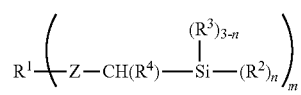

wherein $R^1$, $R^2$, $R^3$, $R^4$, Z, n and m are as previously described. In a preferred embodiment, the alpha hydrocarbyl silane corresponds to the formula described above.

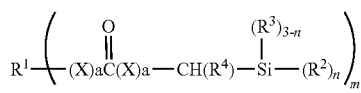

$R^1$, $R^2$, $R^3$, $R^4$, X, a, m and n are as described above. Preferred reaction products of an alpha silane and a hydrocarbyl containing compound include dialkoxyalkylsilylmethyl carbamate-term inated polyether or trialkoxysilylmethyl carbamate-terminated polyether, with dimethoxymethylsilylmethyl carbamate-terminated polyether such as those available form Wacker Silicones under the trademark of GENIOSIL and designation STP-E10 being most preferred.

The alpha hydrocarbyl silanes are present in the composition of the invention in a sufficient amount to enhance the adhesion to and the durability of the bond of the composition to substrates described herein. Preferably, the adhesion and durability of the bond meet the preferred specifications as described herein. If too little is used the composition does not exhibit durable adhesion to the described substrate surfaces. If too much is used then the adhesion performance may be detrimentally impacted. Preferably, the alpha hydrocarbyl silanes are present in the compositions of the invention in an amount of about 1 part by weight or greater based on the weight of the composition and more preferably about 3 parts by weight or greater. Preferably, the alpha hydrocarbyl silanes are present in the compositions of the invention in an amount of about 10 parts by weight or less based on the weight of the composition and more preferably about 8 parts by weight or less. In a preferred embodiment, the reaction products of an alpha silane and an hydrocarbyl containing compound are prepared by known condensation reactions between the alpha silane and the hydrocarbyl containing compound which are well known in the art, see for example, Chiao, U.S. Pat. No. 5,623,044 column 5, line 36 to column 6, line 12.

In those embodiments where the composition is used to bond glass or coated plastic to substrates coated with coatings or paints, including acid resistant paints, it is desirable to have a silane present in some form. The silane may be blended with the prepolymer. In another embodiment, the silane is a silane which has an active hydrogen atom which is reactive with an isocyanate. Preferably, such silane is a mercapto-silane or an amino-silane and more preferably is a mercapto-trialkoxy-silane or an amino-trialkoxy silane. In one embodiment, the silane having, an active hydrogen atom reactive with isocyanate moieties, can be reacted with the terminal isocyanate moieties of the prepolymer. Such reaction products are disclosed in U.S. Pat. Nos. 4,374,237 and 4,345,053, relevant parts incorporated herein by reference. In yet another embodiment, the silane having a reactive hydrogen moiety reactive with an isocyanate moiety can be reacted into the backbone of the prepolymer by reacting such silane with the starting materials during the preparation of the prepolymer. The process for the preparation of prepolymers containing silane in the backbone is disclosed in U.S. Pat. No. 4,625,012, relevant portions incorporated herein by reference. Such silane, having active hydrogen moieties, can be reacted with a polyisocyanate to form an adduct which is blended with the prepolymer, reacted with a polyurethane prepolymer or reacted with a polyisocyanate and a compound having on average more than one moiety reactive with an isocyanate moiety such as those disclosed in Chiao, U.S. Pat. No. 5,623,044, incorporated herein by reference. The amount of silane present is that amount which enhances the adhesion of the adhesive to the substrate surface such as the painted surface or the glass or plastic surface, without the need for a primer. The amount of silane present is preferably, about 0.1 part by weight or greater based on the weight of the sealant and most preferably about 0.5 part by weight or greater. The amount of silane used is preferably about 10 parts by weight or greater or less and most preferably about 2.0 parts by weight or less.

The reactions to prepare the prepolymer and the adduct may be carried out in the presence of urethane catalysts. Examples of such include the stannous salts of carboxylic acids, such as stannous octoate, stannous oleate, stannous acetate, and stannous laurate. Also, dialkyltin dicarboxylates such as dibutyltin dilaurate and dibutyltin diacetate are known in the art as urethane catalysts, as are tertiary amines and tin mercaptides. Preferably, the reaction to prepare the prepolymer is catalyzed by stannous octoate. The amount of catalyst employed is generally between about 0.005 and about 5 parts by weight of the mixture catalyzed, depending on the nature of the isocyanate.

The adhesive also contains a catalyst which catalyzes the reaction of isocyanate moieties with water or an active hydrogen containing compound. Such compounds are well known in the art. The catalyst can be any catalyst known to the skilled artisan for the reaction of isocyanate moieties with water or active hydrogen containing compounds. Among preferred catalysts are organotin compounds, metal alkanoates, and tertiary amines, such as dimorpholinodialkyl ethers. Included in the useful catalysts are organotin compounds such as alkyl tin oxides, stannous alkanoates, dialkyltin carboxylates and tin mercaptides. Stannous alkanoates include stannous octoate. Alkyl tin oxides include dialkyltin oxides, such as dibutyl tin oxide and its derivatives. The organotin catalyst is preferably a dialkyltin dicarboxylate or a dialkyltin dimercaptide. The dialkyltin dicarboxylate preferably corresponds to the formula $(R^5(O)CO)_2$—Sn—$(R^5)_2$ wherein $R^5$ is independently in each occurrence a $C_{1-10}$ alkyl, preferably a $C_{1-3}$ alkyl and most preferably a methyl. Dialkyltin dicarboxylates with lower total carbon atoms are preferred as they are more active catalysts in the compositions of the invention. The preferred dialkyl dicarboxylates include 1,1-dimethyltin dilaurate, 1,1-dibutyltin diacetate and 1,1-dimethyl dimaleate. The organo-tin catalyst is present in an amount of about 60 parts per million or greater based on the weight of the composition and more preferably 120 parts by million or greater. The organotin catalyst is present in an amount of about 1.0 part or less based on the weight of the composition, more preferably 0.5 part by weight or less and most preferably 0.1 part by weight or less.

Other useful catalysts include tertiary amines such as, dimorpholinodialkyl ether, a di((dialkylmorpholino)alkyl) ether, bis-(2-dimethylaminoethyl)ether, triethylene diamine, pentamethyldiethylene triamine, N,N-dimethylcyclohexy-lamine, N,N-dimethyl piperazine 4-methoxyethyl morpholine, N-methylmorpholine, N-ethyl morpholine and mixtures thereof and metal alkanoates, such as bismuth octoate or bismuth neodecanoate. A preferred dimorpholinodialkyl ether is dimorpholinodiethyl ether. A preferred di((dialkylmorpholino)alkyl)ether is (di-(2-(3,5-dimethylmorpholino) ethyl)ether). Tertiary amines or metal alkanoates, such as dimorpholinodialkyl ether or di((dialkylmorpholino)alkyl) ether, are preferably employed in an amount, based on the weight of the composition, of about 0.01 part by weight or greater, more preferably about 0.05 part by weight or greater, even more preferably about 0.1 part by weight or greater, most preferably about 0.2 part by weight or greater and about 2.0 parts by weight or less, more preferably about 1.75 parts by weight or less, even more preferably about 1.0 part by weight or less and most preferably about 0.4 parts by weight or less.

The composition of the invention further comprise one or more catalysts which catalyzes the silanol condensation reaction. In most embodiments, the catalyst for the isocyanate and water or active hydrogen containing compound reaction will catalyze the silanol condensation reaction. In some circumstances, it may be desirable to utilize a second catalyst in the system for silanol condensation. Generally, a silanol condensation catalyst is an acid, a base or a metal salt. Catalysts useful for the silanol condensation reaction are well-known in the art, see Wakabayashi, U.S. Pat. No. 4,910,255, see column 12, line 55 to column 13 line 51 and Mahdi et al., U.S. Pat. No. 6,828,643 column 8, line 37 to column 9, line 27, both incorporated herein by reference. Preferable catalysts include, for example, organotin compounds, acids, bases, acidic phosphate ester compounds, the products of reaction between acidic phosphate ester compounds, amines, saturated or unsaturated polyvalent carboxylic acids or acid anhydrides thereof, and organic titanate compounds. Illustrative organic titanates are titanate esters such as tetrabutyl titanate, tetraisopropyl titanate and triethanolamine titanate. Among preferred tin compounds useful for silanol condensation are, dialkyltin (IV) salts of organic carboxylic acids, such as dibutyltin diacetate, dimethyl tin dilaurate, dibutyltin dilaurate, dibutyltin maleate, dioctyltin dimaleate, or dioctyltin diacetate; tin carboxylates, such as tin octylate or tin naphthenate; reaction products of dialkyltin oxides and phthalic acid esters or alkane diones; dibutyltin phthalate; dialkyltin diacetyl acetonates, such as dibutyltin diacetylacetonate (also commonly referred to as dibutyltin acetylacetonate); dialkyltinoxides, such as dibutyltinoxide and dibutyltin methoxide; tin (II) salts of organic carboxylic acids, such as tin (II) diacetate, tin(II) dioctanoate, tin (II) diethylhexanoate or tin (II) dilaurate, tin octylate; dialkyltin (IV) dihalides, such as dimethyl tin dichloride; and stannous salts of carboxylic acids, such as stannous octoate, stannous oleate, stannous acetate, or stannous laurate. These silanol condensation catalysts may be used individually or in combinations of 2 or more. Preferred catalysts are the dialkyltin dicarboxylates, dialkyltin oxides, dialkyltin bis(acetylacetonates), reaction products of dialkyltin oxide and phthalic acid esters or an alkane dione, dialkyltin halides and dialkyltin oxides. Even more preferred catalysts are dibutyltin dilaurate, dimethyltin dilaurate, dibutyltin maleate, dibutyltin diacetate, tin octylate, tin naphthenate, reaction products of dibutyltin oxide and phthalic acid esters or pentanedione, dibutyltin diacetylacetonate, dibutyltinoxide, dimethyl tin chloride and the like. The amount of catalyst used in the compositions is that amount which facilitates the cure of the composition without causing degradation of the composition after cure. The amount of catalyst in the composition is preferably about 0.01 parts by weight or greater, more preferably about 0.1 part by weight or greater, and most preferably about 0.2 parts by weight or greater, and preferably about 5 parts by weight or less, even more preferably about 1.0 part by weight or less and most preferably about 0.4 parts by weight or less.

For formulating the compositions of the invention, the one or more prepolymers and the silane containing compounds, if present, are combined, preferably with fillers and additives known in the prior art for use in elastomeric compositions. By the addition of such materials, physical properties such as viscosity, flow rate, sag, and the like can be modified. However, to prevent premature hydrolysis of the moisture sensitive groups of the polymer, the filler is preferably thoroughly, dried before admixture therewith. Exemplary filler materials and additives include materials Such as carbon black, titanium dioxide, clays, calcium carbonate, surface treated silicas, ultraviolet stabilizers, antioxidants, and the like. This list, however, is not comprehensive and is given merely as illustrative. The fillers are preferably present in an amount of about 14 parts by weight or greater based on the amount of the sealant and more preferably about 25 parts by weight or greater. The fillers are preferably present in an amount of about 70 parts by weight or less based on the sealant, more preferably 50 parts by weight or less and even more preferably 35 parts by weight or less.

The composition of the invention also preferably contains one or more plasticizers or solvents to modify rheological properties to a desired consistency. Such materials should be free of water, inert to isocyanate groups, and compatible with the polymer. Such material may be added to the reaction mixtures for preparing the prepolymer, or to the mixture for preparing the final sealant composition, but is preferably added to the reaction mixtures for preparing the prepolymer and the adduct, so that such mixtures may be more easily mixed and handled. Suitable plasticizers and solvents are well-known in the art and include dioctyl phthalate, dibutyl phthalate, a partially hydrogenated terpene commercially available as "HB-40", trioctyl phosphate, epoxy plasticizers, toluene-sulfamide, chloroparaffins, adipic acid esters, castor oil, xylene, 1-methyl-2-pyrrolidinone and toluene. The amount of plasticizer used is that amount sufficient to give the desired rheological properties and disperse the components in the sealant composition. Preferably, the plasticizer is present in the compositions of the invention in an amount of about 0 part by weight or greater, more preferably about 5 parts by weight or greater and most preferably about 15 parts by weight or greater. The plasticizer is preferably present in an amount of about 45 parts by weight or less and about 40 parts by weight or less and most preferably about 25 parts by weight or less.

In a preferred embodiment, the composition of the invention includes a light stabilizer. Any light stabilizer which facilitates the composition maintaining durable bond to the substrate for a significant portion of the life of the structure to which it is bonded may be used. Preferred light stabilizers are hindered amine light stabilizers. Hindered amine light stabilizers generally comprise those available from Ciba Geigy such as TINUVIN™ 144 n-butyl-(3,5-di-ter-butyl-4-hydroxybenzyl)bis-(1,2,2,6-pentamethyl-4-piperidinyl) malonate; TINUVIN™ 622 dimethyl succinate polymer with 4-hydroxy-2,2,6,6,-tetramethyl-1-piperidine ethanol; TINUVIN™ 77 bis(2,2,6,6,-tetramethyl-4-piperidinyl) sebacate; TINUVIN™ 1,2,3 bis-(1-octyloxy-2,2,6,6, tetramethyl-4-piperidinyl) sebacate; TINUVIN™ 765 bis(1,2,2,6,6,-pentamethyl-4-piperidinyl) sebacate; CHIMASSORB™ 944 poly [[6-[1,1,3,3-tetramethylbutyl)amino]-1,3,5-triazine-2,4-d iyl][(2,2,6,6-tetramethyl-4-piperidinyl)imino]-1,6-hexanediyl[(2,2,6-tetramethyl-4-piperidinyl)imino]]) and available from Cytec, CYASORB™ UV-500; 1,5-dioxaspiro(5,5) undecane 3,3-dicarboxylic acid, bis(2,2,6,6,-tetramethyl-4-piperidinyl)ester; CYASORB™ UV-3581; 3-dodecyl-1-(2,2, 6,6,-tetramethyl-4-piperidyl-pyrrolidin-2,5-dione) and CYASORB™ UV-3346 Poly[(6-morpholino-s-triazine-2,4-diyl)[2,2,6,6-tetramethyl-4-piperidyl)imino]-hexamethylene [(2,2,6,6-tetramethyl-4-piperidyl)imino]]. More preferred hindered light amine stabilizers include TINUVIN™ 1,2,3 bis-(1-octyloxy-2,2,6,6, tetramethyl-4-piperidinyl) sebacate and TINUVIN™ 765 bis(1,2,2,6,6,-pentamethyl-4-piperidinyl) sebacate and methyl 1,2,2,6,6,-pentamethyl-4-piperidinyl sebacate. A sufficient amount of light stabilizer to enhance the bond durability to the substrate may be used.

Preferably, the light stabilizer is used in amount of about 0.1 part by weight or greater based on the weight of the composition of the invention, more preferably 0.2 parts by weight or greater and most preferably about 0.3 parts by weight or greater. Preferably, the amount of light stabilizer present in the composition of the invention is about 3 weight parts or less, more preferably about 2 weight parts or less and most preferably about 1 weight part or less.

In another preferred embodiment, the composition of the invention further comprises an ultraviolet light absorber. Any ultraviolet absorber which enhances the durability of the bond of the composition of the invention to the substrate may be used. Preferred UV light absorbers include benzophenones and benzotriazoles. More preferred UV light absorbers include those from Ciba Geigy such as TINUVIN™ P; 2-(2'-hydroxy-5'-methylphenyl)-benzotriazole; TINUVIN™ 326 2-(5-chloro-2H-benzotriazol-2-yl)-6-(1,1-dimethylethyl)-4-methylphenol; TINUVIN™ 213 poly(oxy-1,2-ethanediyl), (α(3-(3-(2H-benzotriazol-2-yl)-5-(1,1-dimethylethyl)-4-hydroxyphenyl)-1-oxopropyl)-ω-hydroxy; and poly(oxy-1,2-ethanediyl), (α,(3-(3-(AH-benzotriazol-2-yl)-5-(1,1-dimethylethyl)-4-hydroxyphenyl)-1-oxopropyl)-ω-(α(3-(3-(2H-benzotriazol-2-yl)-5-(1,1-dimethylethyl)-4-hydroxyphenyl)-1-oxopropyl); TINUVIN™ 327 2-(3,5-di-tert-butyl-2-hydroxyphenol)-5-chlorobenzotriazole; TINUVIN™ 571 2-(2H-benzotriazol-2-yl)-6-dodecyl-4-methylphenol, branched and linear; TINUVIN™ 328 2-(2H-benzotriazol-2-yl)-4,6-bis(1,1-dimethylpropyl)phenol and from Cytec such as CYASOR™ UV-9; 2-Hydroxy-4-methoxybenzophenone; CYASORB™ UV-24; 2,2'-dihydroxy-4-methoxybenzophenone; CYASORB™ UV-1164; 2-[4,6-bis (2,4-dimethylphenyl)-1,3,5-triazin-2-yl]-5-(octyloxy) phenol; CYASORB™ UV-2337; 2-(2'-hydroxy-3'-5'-di-t-amylphenyl)benzotriazole; CYASORB™ UV-2908; 3,5-di-t-butyl-4-hydroxybenzoic acid, hexadecyl ester; and CYASORB™ UV-5337; 2-(2'-hydroxy-3',5'-di-t-butylphenyl)-5-chlorobenzotriazole; CYASORB™ UV-531; 2-hydroxy-4-n-octoxybenzophenone; and CYASOR™ UV-3638; 2,2-(1,4-phenylene)bis[4H-3,1-benzoxazin-4-one]. More preferred UV light absorbers include CYASOR™ UV-531; 2-hydroxy-4-n-octoxybenzophenone TINUVIN™ 571 and 2-(2H-benzotriazol-2-yl)-6-dodecyl-4-methylphenol, branched and linear. Preferably, the UV light absorber is used in a sufficient amount to enhance the durability of the bond of the composition of the invention to the substrate. Preferably, the UV inhibitor is used in an amount of about 0.1 part by weight or greater based on the weight of the composition of the invention, more preferably about 0.2 weight parts or greater and most preferably about 0.3 weight parts or greater. Preferably, the UV light inhibitor is used in an amount of about 3 parts by weight or less based on the weight of the composition of the invention, more preferably about 2 parts by weight or less and most preferably about 1 part by weight or less.

In another preferred embodiment, the composition of the invention further comprises a heat stabilizer. Any heat stabilizer which enhances the durability of the bond of the adhesive to the substrate may be used. Preferred heat stabilizers include organophosphate compounds with the following general structure:

$P—(OR^6)_3$ $R^6$ can be independently alkyl, aryl or alkaryl and can contain heteroatoms such as oxygen and phosphorous.

More preferred heat stabilizers include poly(dipropyleneglycol) phenyl phosphite (available from Dover Chemical Corporation under the trademark and designation DOVERPHOS 12), tetrakis isodecyl 4,4'isopropylidene diphosphite (available from Dover Chemical Corporation under the trademark and designation DOVERPHOS 675), Trisnonylphenyl phosphite (available from Dover Chemical Corporation under the trademark and designation DOVERPHOS 4) and phenyl diisodecyl phosphite (available from Dover Chemical Corporation under the trademark and designation DOVERPHOS 7). Preferably, the heat stabilizer is used in a sufficient amount to enhance the durability of the bond of the composition to the substrate. Preferably, the heat stabilizer is used in an amount of about 0.1 part by weight or greater based on the weight of the adhesive composition or clear primer, more preferably about 0.2 weight parts or greater and most preferably about 0.3 weight parts or greater. Preferably, the heat stabilizer is used in an amount of about 3 parts by weight or less based on the weight of the composition of the invention, more preferably about 2 parts by weight or less and most preferably about 1 part by weight or less.

The composition of the invention may be formulated by blending the components together using means well-known in the art. Generally, the components are blended in a suitable mixer. Such blending is preferably conducted in an inert atmosphere and in the absence of atmospheric moisture to prevent premature reaction. It may be advantageous to add any plasticizers to the reaction mixture for preparing the isocyanate containing prepolymer so that such mixture may be easily mixed and handled. Alternatively, the plasticizers can be added during blending of all the components. Once the composition is formulated, it is packaged in a suitable container such that it is protected from atmospheric moisture. Contact with atmospheric moisture could result in premature cross-linking of the prepolymer utilized in the compositions of the invention.

The composition of the invention is used to bond porous and nonporous substrates together. The composition is applied to a first substrate and the composition on the first substrate is thereafter contacted with a second substrate. Thereafter, the composition is exposed to curing conditions. In a preferred embodiment, one substrate is glass or clear plastic coated with an abrasion resistant coating and the other substrate is a plastic, metal, fiberglass or composite substrate which may optionally be painted or coated. The plastic coated with an abrasion resistant coating can be any plastic which is clear, such as polycarbonate, acrylics, hydrogenated polystyrene or hydrogenated styrene conjugated diene block copolymers having greater than 50 percent styrene content. The coating can comprise any coating which is abrasion resistant such as a polysiloxane coating. Preferably, the coating has an ultraviolet pigmented light blocking additive. Preferably, the glass or coated plastic window has an opaque coating disposed in the region to be contacted with the adhesive to block UV light from reaching the adhesive. This is commonly referred to as a frit. For glass the coating is an inorganic enamel or an organic coating.

In a preferred embodiment, the composition of the invention is applied to the surface of the glass or coated plastic, along the portion of the glass or coated plastic which is to be bonded to the structure. The composition is thereafter contacted with the second substrate such that the composition is disposed between the glass or coated plastic and the second substrate. The composition is allowed to cure to form a durable bond between the glass or coated plastic and the substrate. This method is especially effective for substrates painted with an acid resistant paint. In preferred embodiments, the surfaces to which the composition is applied are cleaned prior to application; see for example, U.S. Pat. Nos. 4,525,511, 3,707,521 and 3,779,794. Generally, the compositions of the invention are applied at an ambient temperature in the presence of atmospheric moisture. Exposure to atmospheric moisture is sufficient to result in curing of the composition. Curing may be further accelerated by applying heat to the curing composition by means of convection heat, or microwave heating.

In another embodiment, the composition may be applied to the surface of the other substrate and then contacted with the glass or coated plastic as described. The compositions of this invention are especially effective in bonding to acid resistant paints, such as, Dupont's GEN™ IV coating which is a silane modified acrylic melamine coating, melamine carbamate coatings, two part polyurethane coatings and acid epoxy coatings.

Working time is the time period after application to a substrate wherein the composition is sufficiently tacky to be applied to the surface of a second substrate to bond with the second substrate. Preferably, the composition of the invention is formulated to provide a working time of 6 minutes or greater and more preferably 10 minutes or greater. Preferably, the working time is 15 minutes or less and more preferably 12 minutes or less.

In reference to polyurethane prepolymers, average isocyanate functionality is determined according to Bhat, U.S. Pat. No. 5,922,809 at column 12, line 65 to column 13, line 26, incorporated herein by reference. Molecular weights as described herein are determined according to the following procedure disclosed in Bhat, U.S. Pat. No. 5,922,809 at column 12, lines 50 to 64, incorporated herein by reference. Parts by weight refer to compositions which comprise 100 parts total.

The adhesion performance of an adhesive is evaluated by a Quick Knife Adhesion (QKA) test. In a QKA test, an adhesive bead of 6.3 mm (width)×6.3 mm (height)×100 mm (length) is placed on the tested substrate and the assembly is cured for a specific time at 23° C. and 50 percent RH (relative humidity). The cured bead is then cut with a razor blade at a 45° angle while pulling back the end of the bead at 180° angle to the substrate. The degree of adhesion is evaluated as adhesive failure (AF) and/or cohesive failure (CF). In case of AF, the cured bead can be separated from the substrate and in CF separation occurs only within the adhesive bead as a result of knife cutting. The adhesion strength is often characterized by lap shear testing. A triangle bead of the composition approximately 6.3 mm wide by 8 mm high is applied along the width of the glass substrate (25 mm×75 mm) and approximately 6 mm to 12 mm from the end. The second painted substrate is immediately pressed onto the composition to give a final height of 6.3 mm for the composition in between. Then, the sample structure is allowed to cure under 23° C. and 50 percent relative humidity for 7 days unless specified otherwise. The sample was then pulled right away or after more environmental exposures at a rate of 1 inch/minute (25 mm/min) with an Instron Tester. The load at break of the sample is recorded. Weather-O-Meter (WOM) chamber is often used to accelerate the testing of weathering ability of the sample. SAE J1885 conditions are used here unless specified otherwise.

Parts by weight as used herein refers to 100 parts by weight of the composition specifically referred to. In most cases this refers to the adhesive composition of this invention.

SPECIFIC EMBODIMENTS OF INVENTION

The following examples are included for illustrative purposes only and are not intended to limit the scope of the invention. Unless otherwise stated, all parts and percentages are by weight.

Example 1

A polyether polyurethane prepolymer was prepared by thoroughly mixing 221.1 grams of a polyoxypropylene diol (VORANOL™ 220-056 polyol having an average molecular weight of 2000), 294.6 grams of polyoxypropylene triol (VORANOL™ 232-236 polyol having an average molecular weight of 4500 VORANOL™ is a trademark of The Dow Chemical Company) and 20.0 grams of alkyl phthalate plasticizer in a 2-liter resin kettle equipped with a mechanical agitator, a nitrogen inlet adapter and a thermometer. Under nitrogen purge, the mixture was heated to 54° C. 92.90 grains of molten diphenylene methane 4,4' diisocyanate were added to the mixture and thoroughly mixed. Then 0.05 grams of stannous octoate were introduced and the mixture was mixed for one hour. Finally, 288.8 grains of alkyl phthalate plasticizer, 0.01 grain of MULTIFLOW™ (available from Solutia) and 8.9 grains of diethyl malonate were added to the mixture which was then mixed for 15 minutes. Thereafter, 13.3 grams of bis-(3-trimethoxysilylpropyl)amine was added and the mixture was mixed for two hours. Then 60.4 grams of DESMODUR™ N-3300 (an aliphatic polyisocyanate resin based on hexamethylene diisocyanate, supplied by Bayer USA Inc.) was added and the mixture was mixed for 15 minutes. The resulting prepolymer had an isocyanate content of 2.54 percent by weight and a viscosity of 10,800 cps (10.8 N—S/square meter) at 25° C.

Example 2

983.7 grains of the prepolymer from Example 1, 80 grains of a dimethoxymethylsilylmethyl carbamate terminated polyether, GENOSIL™ STP-E10 available from Wacker Silicones, and 4.70 g of dimorpholinodiethyl ether were mixed in a Ross planetary mixer at a speed of 3 under vacuum for 10 minutes. Mixing was stopped and the vacuum was broken using nitrogen. To the mixture were added 40 grains of calcium carbonate and 451.2 grains of carbon black, both were oven dried and cooled to room temperature before use. The mixture was mixed for 2 minutes without vacuum at speed 2 to wet the fillers out, and then mixed at speed 3 for 15 minutes under vacuum. The mixture was scraped down and then 9.76 grams WESTON™ TNPP available from Crompton Corporation, 12.8 grams of TINUVIN™ 571 2-(2H-benzotriazol-2-yl)-6-dodecyl-4-methylphenol, linear and branched and 12.8 grams of TINUVIN™ 765; and a mixture bis(1,2,6,6,-pentamethyl-4-piperidinyl) sebacate and methyl 1,2,2,6,6-pentamethyl-4-piperidinyl sebacate both available from CIBA GEIGY; were added and the resulting mixture was mixed for 10 minutes at a speed of 3 with vacuum. The resulting mixture was packaged into air tight tubes. The adhesion performance of the prepared composition was evaluated using QKA and lap shear testing.

The composition from Example 2 was tested against a metal coupon substrate coated with acid resistant automotive paint system. Electro coated metal coupons were coated with Dupont's GEN IV™ ES basecoat (~25 micron) and clearcoat (~25 micron) and baked under normal baking conditions for 29 minutes at 285° F. (141° C.). These coupons were ready for testing in 3 to 4 hours after baking. The QKA beads from Example 2 were laid onto these GEN IV™ ES coated coupons. One sample was stored for 7 days at 23° C. and 50 percent relative humidity conditions and the QKA test was performed. The mode of failure was 100 percent cohesive failure. A second sample was stored for 7 days at 23° C. and 50 percent relative humidity conditions and then 14 days at 38° C. and 100 percent relative humidity conditions. The QKA result of the second sample was 100 percent cohesive failure.

The composition from Example 2 was also tested against glass substrates. Two sets of QKA samples of Example 2 were prepared for each of the following three types glass coupons 1) glass coupons with bismuth-zinc ceramic enamel from gravity bent process, 2) glass coupons with zinc ceramic enamel from gravity bent process and 3) glass coupons of regular float glass. Each glass Coupon was pre-wiped with isopropanol using lint free cheese cloth before the adhesive bead of Example 2 was laid. The first set of QKA samples were exposed to 23° C. and 50 percent relative humidity conditions for 7 days, the second set of QKA samples were exposed to 23° C. and 50 percent relative humidity conditions for 7 days and then 38° C. and 100 percent relative humidity conditions for 14 days. QKA was performed thereafter and 100 percent cohesive failure was observed on all six samples. More QKA samples were prepared as described above on bismuth-zinc enamel glass coupons which were pre-primed with BEATSEAL™ 43518 clear glass primer and BEATSEAL™ 43520A blackout glass primer (both available from The Dow Chemical Company). All samples were cured at 23° C. and 50 percent relative humidity for 7 days. Thereafter, these samples were separated to 2 sets. The first set samples were immersed into 50° C. water for 29, 60 and 90 days. The second set samples were stored in 90° C. oven for 32, 60 and 90 days. All samples from the first set exhibited 100 percent cohesive failure after QKA Test. All samples from the second set exhibited 100 percent cohesive failure after QKA Test except the samples from 90 days demonstrated 90 and 85 percent cohesive failure, with 10 and 15 percent adhesive failure (failure of the adhesive bond to the substrate).

Lap shear samples of Example 2 were prepared using metal coupons coated with GEN IV™ ES paint system described above and glass coupons. Two types of glass coupons were used. One has the zinc type enamel coating and the second bismuth-zinc type enamel coating. Both were obtained from the gravity bent process as described above. The ceramic enamel coated glass coupons were wiped with isopropanol and the painted coupon wiped with naphtha before setting up the lap shear sample.

After the lap shear samples were prepared according to the procedure described earlier, they were exposed to several conditions: condition (1), 7 days exposure at 23° C. and 50 percent relative humidity, condition (2), 7 days exposure at 23° C. and 50 percent relative humidity and then 14 days exposure at 38° C. and 100 percent relative humidity, and condition (3), 7 days exposure at 23° C. and 50 percent relative humidity and then 2000 hours exposure in weathermeter under SAE J1885 conditions. After exposure to these conditions, the lap shear testing was performed on the samples. For the lap shear sample using GEN IV™ ES painted coupon and zinc enamel glass coupon, the lap shear test strength at break was 570 psi (3.93 MPa) with 100 percent cohesive failure after condition 1 and 549 psi (3.79 MPa) with 100 percent cohesive failure after condition 2. For the lap shear sample using GEN IV™ ES painted coupon and bismuth-zinc enamel glass Coupon, the lap shear test strength at break was 551 psi (3.80 MPa) with 100 percent cohesive failure after condition 1, 564 psi (3.89 MPa) with 100 percent cohesive failure after condition 2, and 455 psi (3.14 MPa) with 100 percent cohesive failure after condition 3.

What is claimed is:

1. A composition comprising:
   (1) one or more urethane prepolymers having isocyanate moieties;
   (2) a catalytic amount of one or more compounds which catalyze the reaction of isocyanate moieties with water or an active hydrogen containing compound; and
   (3) one or more alpha hydrocarbyl silane compounds corresponding to the formula

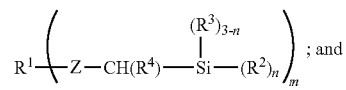
; and wherein:
$R^1$ is independently in each occurrence an aliphatic polyether;
$R^2$ is independently in each occurrence a hydrolyzable group;
$R^3$ is independently in each occurrence a monovalent hydrocarbon:
$R^4$ is independently in each occurrence $C_{1-3}$ alkyl or hydrogen
Z is independently in each occurrence a heteroatom containing functional linkage;
n is independently in each occurrence an integer of 1 to 3: and
m is about 1 or greater.

2. A composition according to claim 1
wherein:
$R^1$ is independently in each occurrence an aliphatic polyether;
$R^2$ is independently in each occurrence a hydrocarbyloxy;
$R^3$ is independently in each occurrence an alkyl group having 1 to 20 carbon atoms, an aryl group having 6 to 20 carbon atoms, a cycloalkyl group having 5 to 20 carbon atoms or an aralkyl group having 7 to 20 carbon atoms;
Z is independently in each occurrence oxygen, sulfur, a tertiary or secondary amine ($N(R^4)$), carbonyl or a functional group corresponding to the formula

X is independently in each occurrence oxygen, sulfur or $N(R^4)$;
$R^4$ is independently in each occurrence hydrogen or alkyl; and
a is independently in each occurrence 0 or 1 with the proviso that for every instance of the represented functional group the sum of a is 1 or 2;
m is a number of from 2 to 6; and
n is 2 or 3.

3. A composition according to claim 2
wherein:
$R^1$ is independently in each a polyalkylene oxide group;
$R^2$ is independently a $C_{1-10}$ alkyloxy or alkenyloxy group;
$R^3$ is independently in each occurrence a methyl, ethyl, cyclohexyl, phenyl, or benzyl group;
$R^4$ is independently in each occurrence $C_{1-3}$ alkyl or hydrogen;

Z is independently in each occurrence

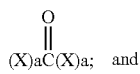

and

X is independently in each occurrence O or N(R$^4$).

4. A composition according to claim 1 wherein the polyurethane prepolymer further comprises silane functionality or the composition further comprises a compound or polymer containing silane moieties.

5. A composition according to claim 1 which comprises:
   (1) from about 40 parts to about 80 parts by weight or less based on the weight of the composition of one or more polyurethane prepolymers;
   (2) from about 60 parts per million to about 2.0 parts by weight based on the weight of the composition of one or more compounds which catalyze the reaction of isocyanate moieties with water or an active hydrogen containing compound; and
   (3) from about 1 to about 10 parts by weight of one or more alpha hydrocarbyl silane compounds.

6. A composition according to claim 5 wherein the composition comprises a catalytic amount of one or more compounds which catalyzes silanol condensation which is different from the one or more compounds which catalyze the reaction of isocyanate moieties with water or an active hydrogen containing compound.

7. A composition according to claim 6 which comprises from about 0.1 to about 2.0 parts by weight of one or more compounds which catalyze silanol condensation.

8. A composition according to claim 1 wherein the composition further comprises one or more of a light stabilizer, an ultraviolet light absorber and a heat stabilizer.

9. A composition according to claim 8 wherein the composition comprises one or more light stabilizers, one or more ultraviolet light stabilizers and one or more heat stabilizers.

10. A composition according to claim 8 wherein the composition further comprises one or more plasticizers.

11. A composition according to claim 8 wherein the composition further comprises carbon black and calcium carbonate.

12. A method of bonding glass or an abrasion resistant coating coated plastic to a substrate which comprises applying a composition according to claim 1 to the glass or coated plastic surface or the substrate surface; contacting the glass or coated plastic and substrate such that the composition is located between the glass or coated plastic and the substrate; allowing the composition to cure so as to bond the glass or coated plastic to the substrate.

13. Methods according to claim 12 wherein the glass or coated plastic surface to which the adhesive is bonded has a ceramic frit coated on the surface and the substrate surface has a coating thereon.

14. Methods according to claim 12 wherein the glass or coated plastic surface and the coated substrate surface are unprimed.

15. Methods according to claim 14 wherein the substrate is an automobile and the glass or coated plastic is adapted for use as a window.

16. The composition according to claim 1 wherein the alpha hydrocarbyl silane is an adduct of an alpha silane having a functional group on the alpha carbon and a hydrocarbyl compound having a functional moiety wherein the functional moieties of the alpha silane and the hydrocarbon compound are reactive with one another.

17. The composition according to claim 16 wherein one functional moiety has an active hydrogen atom and the other functional moiety is an isocyanate.

18. Compositions according to claim 16 wherein the alpha silane corresponds to the formula

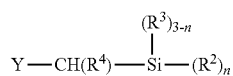

and the hydrocarbyl compound corresponds to the formula

wherein
R$^1$ is independently in each occurrence an aliphatic polyether;
R$^2$ is independently in each occurrence a hydrolyzable group;
R$^3$ is independently in each occurrence a monovalent hydrocarbon;
R$^4$ is independently in each occurrence hydrogen or alkyl;
Y is independently in each occurrence halo, hydroxyl, thiol, primary or secondary amino, acid halide, carboxyl, aldehyde, isocyanato, alkoxy, alkylthiol, or an epoxy groups;
n is independently in each occurrence an integer of 1 to 3; and
m is about 1 or greater.

* * * * *